(12) United States Patent
Jung

(10) Patent No.: US 10,555,299 B2
(45) Date of Patent: Feb. 4, 2020

(54) METHOD AND APPARATUS FOR TRANSMITTING SIGNAL IN BEAM FORMING-BASED COMMUNICATION SYSTEM

(71) Applicant: Samsung Electronics Co., Ltd., Suwon-si, Gyeonggi-do (KR)

(72) Inventor: Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/645,893

(22) Filed: Jul. 10, 2017

(65) Prior Publication Data

US 2017/0311324 A1  Oct. 26, 2017

Related U.S. Application Data

(63) Continuation of application No. 13/933,020, filed on Jul. 1, 2013.

(30) Foreign Application Priority Data

Jun. 29, 2012 (KR) .................. 10-2012-0071142

(51) Int. Cl.
  *H04W 72/04* (2009.01)
  *H04B 7/06* (2006.01)

(52) U.S. Cl.
  CPC ...... *H04W 72/0446* (2013.01); *H04B 7/0617* (2013.01)

(58) Field of Classification Search
  CPC .................................. H04W 72/0446
  USPC .................................... 455/452.1
  See application file for complete search history.

(56) References Cited

U.S. PATENT DOCUMENTS

| | | | |
|---|---|---|---|
| 5,621,752 A | 4/1997 | Antonio et al. | |
| 6,233,466 B1 | 5/2001 | Wong et al. | |
| 6,347,234 B1 * | 2/2002 | Scherzer | H04B 7/0408 455/550.1 |
| 7,447,523 B2 | 11/2008 | Goldberg et al. | |
| 8,315,657 B2 | 11/2012 | van Rensburg et al. | |
| 2005/0272472 A1 * | 12/2005 | Goldberg | H04W 16/28 455/562.1 |
| 2010/0103900 A1 | 4/2010 | Yeh et al. | |

(Continued)

FOREIGN PATENT DOCUMENTS

| | | |
|---|---|---|
| EP | 2120366 A2 | 11/2009 |
| KR | 10-2012-0045042 A | 5/2012 |

OTHER PUBLICATIONS

ISA/KR, "International Search Report," Application No. PCT/KR2013/005804, dated Oct. 22, 2013, 5 pages, Korean Intellectual Patent Office, Daejeon, Korea.

(Continued)

*Primary Examiner* — Chuck Huynh

(57) ABSTRACT

A method of transmitting a signal by a base station in a beam forming-based communication system is provided. The method includes: transmitting the signal using a transmission beam having at least one of a beam width and a transmission period in reverse proportion to one of a distance between a position of a transmission target region of the transmission beam for transmitting the signal within a service coverage of the base station and the base station and a size or area of the transmission target region.

8 Claims, 13 Drawing Sheets

(56) References Cited

U.S. PATENT DOCUMENTS

| | | |
|---|---|---|
| 2010/0165914 A1 | 7/2010 | Cho et al. |
| 2010/0265924 A1 | 10/2010 | Yong et al. |
| 2011/0032149 A1 | 2/2011 | Leabman |
| 2011/0065448 A1 | 3/2011 | Song et al. |
| 2012/0258754 A1 | 10/2012 | Banu et al. |
| 2013/0315083 A1 | 11/2013 | Jung |

OTHER PUBLICATIONS

ISA/KR, "Written Opinion of the International Searching Authority," Application No. PCT/KR2013/005804, dated Oct. 22, 2013, 5 pages, Korean Intellectual Property Office, Daejeon, Korea.
Communication from a foreign patent office in a counterpart foreign application, The Korean Intellectual Property Office, "Notification of the Reasons for Rejection," Application No. KR 10-2010-0071142, dated May 14, 2018, 9 pages.

* cited by examiner

METHOD AND APPARATUS FOR TRANSMITTING SIGNAL IN BEAM FORMING-BASED COMMUNICATION SYSTEM

CROSS-REFERENCE TO RELATED APPLICATION(S) AND CLAIM OF PRIORITY

This application is a continuation of U.S. application Ser. No. 13/933,020, filed Jul. 1, 2013, which claims the benefit under 35 U.S.C. § 119(a) of Korean Application No. 10-2012-0071142, filed Jun. 29, 2012, the disclosures of which are fully incorporated hereby by reference.

TECHNICAL FIELD

The present disclosure generally relates to a method and apparatus for transmitting a signal in a beam forming-based communication system.

BACKGROUND

Due to the use of terminals such as smart phones, the average amount mobile communication users increases exponentially and for this, the users' demand for a higher data transmission rate continuously increases.

A method of providing a generally high data transmission rate includes a method of providing communication using a wider frequency band and a method of increasing frequency usage efficiency. Here, the method of increasing the frequency usage efficiency is very difficult to provide a higher average data transmission rate. The reason is because the communication technologies of this generation provide a frequency usage efficiency near a theoretical limit and thus, a technical improvement for increasing the frequency usage efficiency further is difficult. Thus, to increase a data transmission rate, a method of providing data services through a wider frequency band may be considered. In that event, an available frequency band should be considered. In view of the current frequency distribution policy, a band in which a broad band communication of 1 GHz or more is possible is limited and a practically selectable frequency band is only the millimeter wave band of 30 GHz or more. In such a high frequency band, signal attenuation occurs very severely depending on a distance unlike the 2 GHz band used by conventional cellular systems. Due to such signal attenuation, the service providing coverage of a base station that uses power, which is the same with that of the conventional cellular systems, will be considerably reduced. In order to solve this problem, a beam forming technique is widely used which concentrates transmission/reception power to a narrow space so as to increase the transmission/reception efficiency of an antenna.

However, in a beam forming-based communication system, as a beam width increases, a general beam forming effect is reduced in proportion thereto. Also, as the beam width decreases, the beam forming effect further increases. Thus, when one beam width is reduced in order to increase the beam forming effect, the number of transmission beams required for the corresponding base station region increases. Consequently, an overhead for signal transmission increases. That is, since the beam forming effect and the transmission overhead have a trade-off relationship, a measure to increase the beam forming effect while reducing the transmission overhead is desirable.

SUMMARY

To address the above-discussed deficiencies of the prior art, it is a primary object to provide a method and apparatus for transmitting a signal efficiently in a beam forming-based communication system.

Also, another aspect of the present disclosure is to provide a method and apparatus for dynamically adjusting a beam width or a transmission period of a downlink transmission beam used by a base station for data communication in a beam forming-based communication system according to a position or size or area of a target region to which the transmission beam is transmitted.

According to an aspect of the present disclosure, a method of transmitting a signal by a base station in a beam forming-based communication system. The method includes: transmitting the signal using a transmission beam having at least one of a beam width and a transmission period in reverse proportion to one of a distance between a position of a transmission target region of the transmission beam for transmitting the signal within a service coverage of the base station and the base station and a size or area of the transmission target region.

According to another aspect of the present disclosure, there is provided a method of receiving a signal by a terminal in a beam forming-based communication system. The method includes: receiving the signal transmitted using a transmission beam having at least one of a beam width and a transmission period in reverse proportion to one of a distance between a position of a transmission target region of the transmission beam for transmitting the signal within a service coverage of the base station and the base station and a size or area of the transmission target region; correcting the reception intensity of the signal using information for beam widths of transmission beams and an antenna gain for each beam width, the information being received through broadcast channel; and determining an optimal transmission beam having a maximum reception intensity among transmission beams that transmit the signal.

According to yet another aspect of the present disclosure, there is provided a base station that transmits a signal in a beam forming-based communication system. The base station includes: a transmission unit configured to transmit the signal using a transmission beam having at least one of a beam width and a transmission period in reverse proportion to one of a distance between a position of a transmission target region of the transmission beam for transmitting the signal within a service coverage of the base station and the base station and a size or area of the transmission target region.

According to still another aspect of the present disclosure, there is provided a terminal that receives a signal in a beam forming-based communication system. The terminal includes: a reception unit configured to receive the signal transmitted using a transmission beam having at least one of a beam width and a transmission period in reverse proportion to one of a distance between a position of a transmission target region of the transmission beam for transmitting the signal within a service coverage of the base station and the base station and a size or area of the transmission target region; and a controller configured to correct the reception intensity of the signal using information for beam widths of transmission beams and an antenna gain for each beam width, the information being received through a broadcast channel, and to determine an optimal transmission beam having a maximum reception intensity among the transmission beams that transmit the signal.

The present disclosure enhances a beam forming effect while reducing transmission overhead by dynamically adjusting a beam width or transmission period of a downlink transmission beam according to a position or a size or area of a target region to which the downlink transmission beam is transmitted in a beam forming-based communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one of operations, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
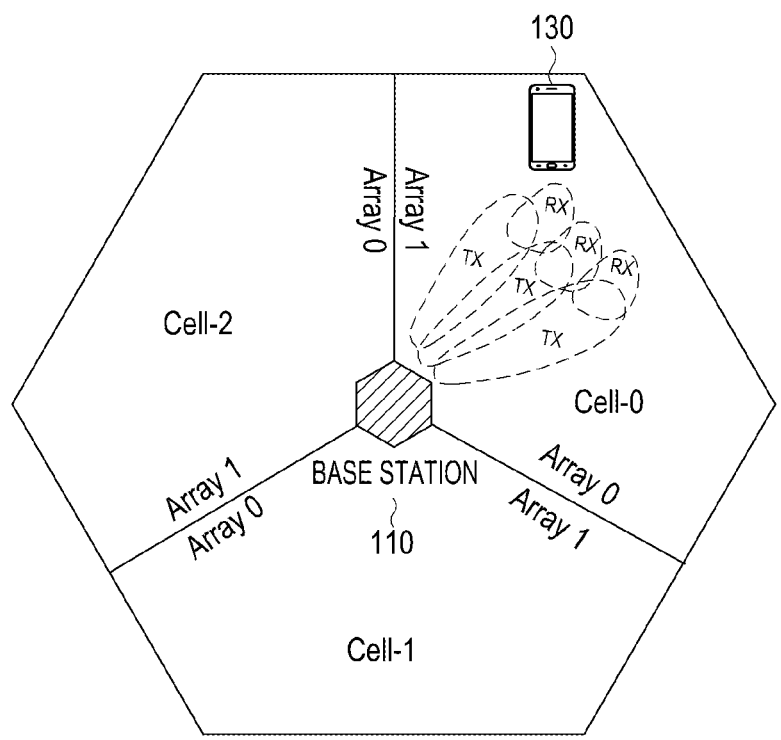
FIG. 1 illustrates a general communication system that provides beam forming using an antenna array.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged base station or terminal. Hereinafter, operation principles of certain embodiments of the present disclosure will be described in detail with reference to accompanying drawings. Similar elements will be denoted by the same reference numerals if possible even if they are illustrated in different drawings. In the following descriptions, the detailed descriptions for related well-known functions or configurations will be omitted so as to not obscure the subject matter of the present disclosure. In addition, the terms used herein are defined in consideration of the functions thereof in the present disclosure and may be varied according to an intention of a user or an operator or a practice. Therefore, the terms should be defined based on the contents of the specification as a whole.

FIG. 1 illustrates a general communication system that provides beam forming using an antenna array. Here, a case in which the service coverage of the base station 110 comprises three cells Cell-0, Cell-1 and Cell-2.

Referring to FIG. 1, the base station 110 may transmit data while changing the direction of a transmission (Tx) beam for a downlink (hereinafter, referred to as "DL") using a plurality of antenna arrays, for example, Array 0 and Array 1, for each cell. In addition, the terminal 130 may also receive data while changing the direction of a reception (Rx) beam.

In the communication system that uses the beam forming technique, the base station 110 and the terminal 130 select a transmission beam direction and a reception beam direction that show an optimal channel environment among various transmission beam directions and reception beam directions to provide a data service. This process may be equally applied to an uplink (hereinbelow, to be referred to as "UL") channel that transmits data from the terminal 130 to the base station 110 beyond the DL channel that transmits data from the base station 110 to the terminal 130. Let's assume a case in which the number of directions of transmission beams capable of being transmitted by the base station 110 is N and the number of directions of reception beams capable of being received by the terminal 130 is M. In this case, the simplest method of selecting the transmission/reception direction of the optimal DL is to transmit a previously promised signal to each of the N possible transmission beam directions at least M times from the base station 110 and to receive a signal transmitted using each of the N transmission beams by the terminal 130 using each of the M reception beams. In such a method, the base station 110 should transmit a specific reference signal at least N×M times. The terminal 130 should also receive the specific reference N×M times and measure the reception intensity of the received signal. In addition, the terminal 130 may determine a direction where a transmission/reception beam having the maximum value among the measured values of N×M times is measured is the optimal transmission/reception beam direction. The process of transmitting a signal in every transmittable direction by the base station 110 at least one of times as described above is referred to as a beam sweeping process and the process of selecting the optimal transmission/reception beam direction by the terminal 130 is referred to as a beam selection process. The beam selection process for DL as described above may be equally applied to the UL transmission/reception process in which the terminal 130 transmits data to the base station 110.

In a conventional cellular system, a base station should transmit common control channels such as an SCH (Sync CHannel) and a BCH (Broadcast CHannel) to the entire region of the service coverage of the base station. In order to transmit SCH and BCH to the entire service coverage of the base station in the communication system that conducts communication using a beam forming technique as illustrated in FIG. 1, the beam sweeping method may be used. The base station may use a method which transmits the SCH and BCH in every transmittable direction at least once. At this time, the transmission times required for transmitting the SCH and BCH using the beam sweeping method are proportional to the number of transmission beams existing in the service coverage of the base station 110.

Figure 2:
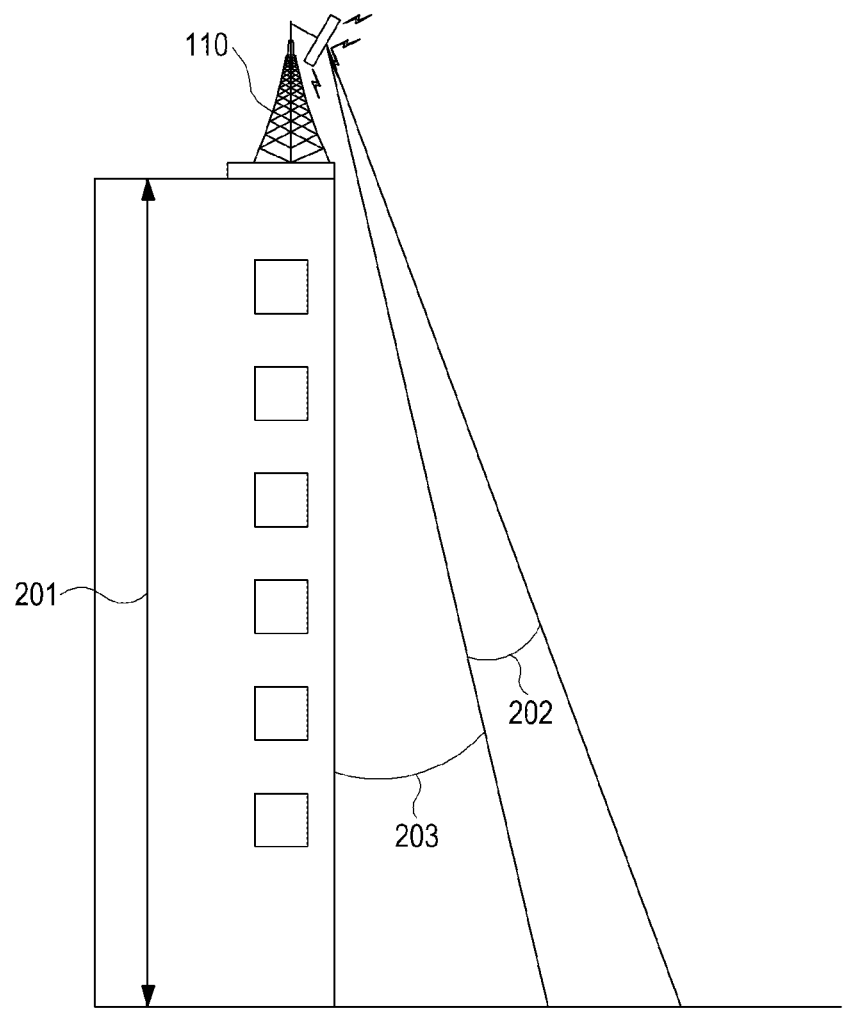
FIG. 2 illustrates a case in which a signal is transmitted through a transmission beam having a predetermined beam width in a communication system using a beam forming technique in general.

FIG. 2 illustrates a case in which a signal is transmitted through a transmission beam having a predetermined beam width in a communication system using a beam forming technique in general. Here, descriptions will be made assuming that the communication system is the same with the communication system of FIG. 1.

Referring to FIG. 2, it is assumed that the base station 110 is installed at a position of a predetermined height 201 from the ground and has acquired a predetermined beam width 202. The beam width of the base station 110 may be defined for each of an elevation angle and an azimuth. In general, the elevation angle means an angle where an antenna configured to transmit/receive a radio wave looks at a satellite (i.e., an angle between the antenna and the ground). Since the elevation angle is in the direction where the antenna of the base station 110 looks down at the ground as illustrated in FIG. 2, the elevation angle may be understood as an angle 203 between a vertical axis in a building of a predetermined height 201 where the base station 110 is installed and the transmission beam. In addition, although not illustrated in FIG. 2, the azimuth may be understood as an angle in a horizontal direction where the transmission beam is propagated.

FIG. 2 illustrates that the transmission beam of the base station 110 is transmitted in a direction corresponding to the predetermined elevation angle 203.

Figure 3:
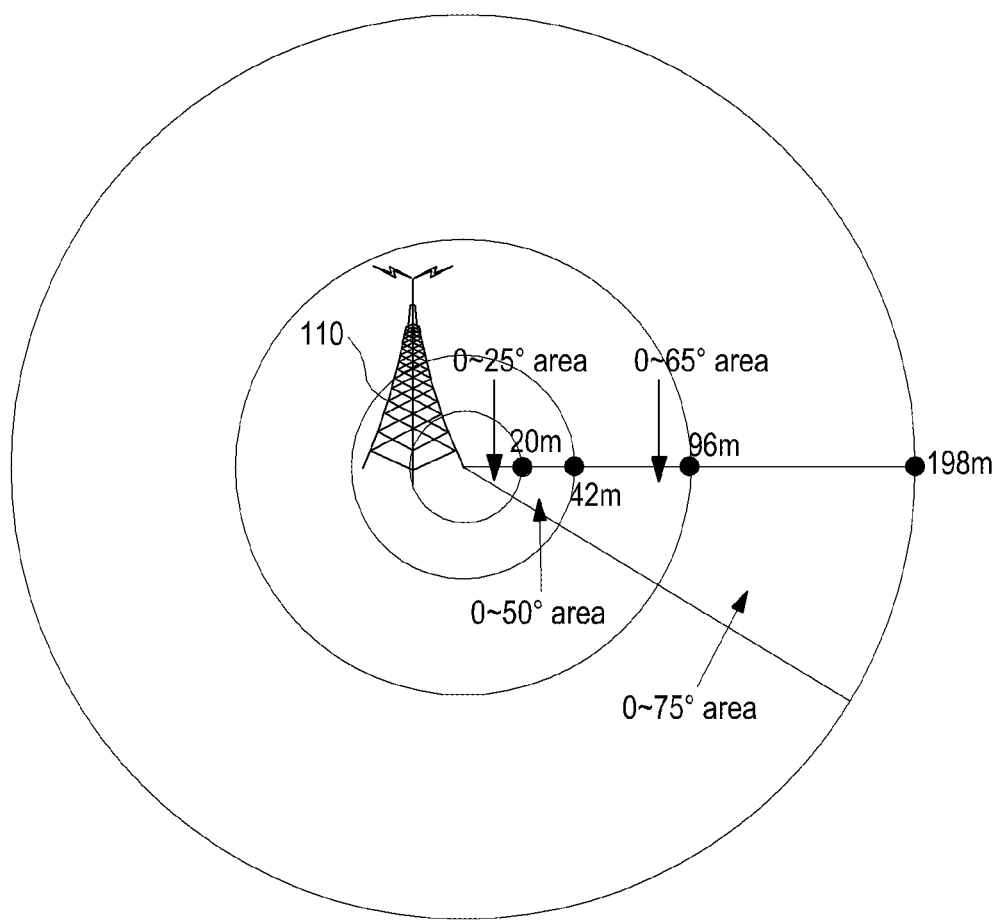
FIG. 3 illustrates ranges where transmission beams arrive depending on an elevation angle from a base station installed in the manner as illustrated in FIG. 2.

FIG. 3 illustrates ranges where transmission beams arrive depending on an elevation angle from a base station installed in the manner as illustrated in FIG. 2. Here, in the base station 110 installed as illustrated in FIG. 2, the range where each transmission beam arrives depending on the elevation angle when it is considered that the base station installed height is 35 m and transmission beams only go straight. In general, a signal of a transmission beam may also be received at a certain intensity in an area beyond a transmission target region. However, in the example of FIG. 3, it is assumed that the reception beyond the transmission target region is not considered.

Referring to FIG. 3, it is assumed that the service coverage of the base station 110 is 200 m from the center of the base station 110, as an example. In addition, without an obstacle and when the elevation angle is 25°, the transmission beam transmitted by the base station 110 arrives at a position of 20 m from the center of the service coverage and when the elevation angle is 50°, the transmission beam arrives at a position of 42 m from the center of the service coverage. In addition, when the elevation angle is 65°, the transmission beam transmitted by the base station 110 arrives at a position of 96 m from the center of the service coverage and when the elevation angle is 75°, the transmission beam arrives at a position of 198 m from the center of the service coverage. Through the example of FIG. 3, it may be seen that as the elevation angle increases, the transmission beam transmitted by the base station 110 may be transmitted to a farther area and as the transmission beam is transmitted to a farther distance from the base station 110, it may be received over a wider area.

Figure 4:
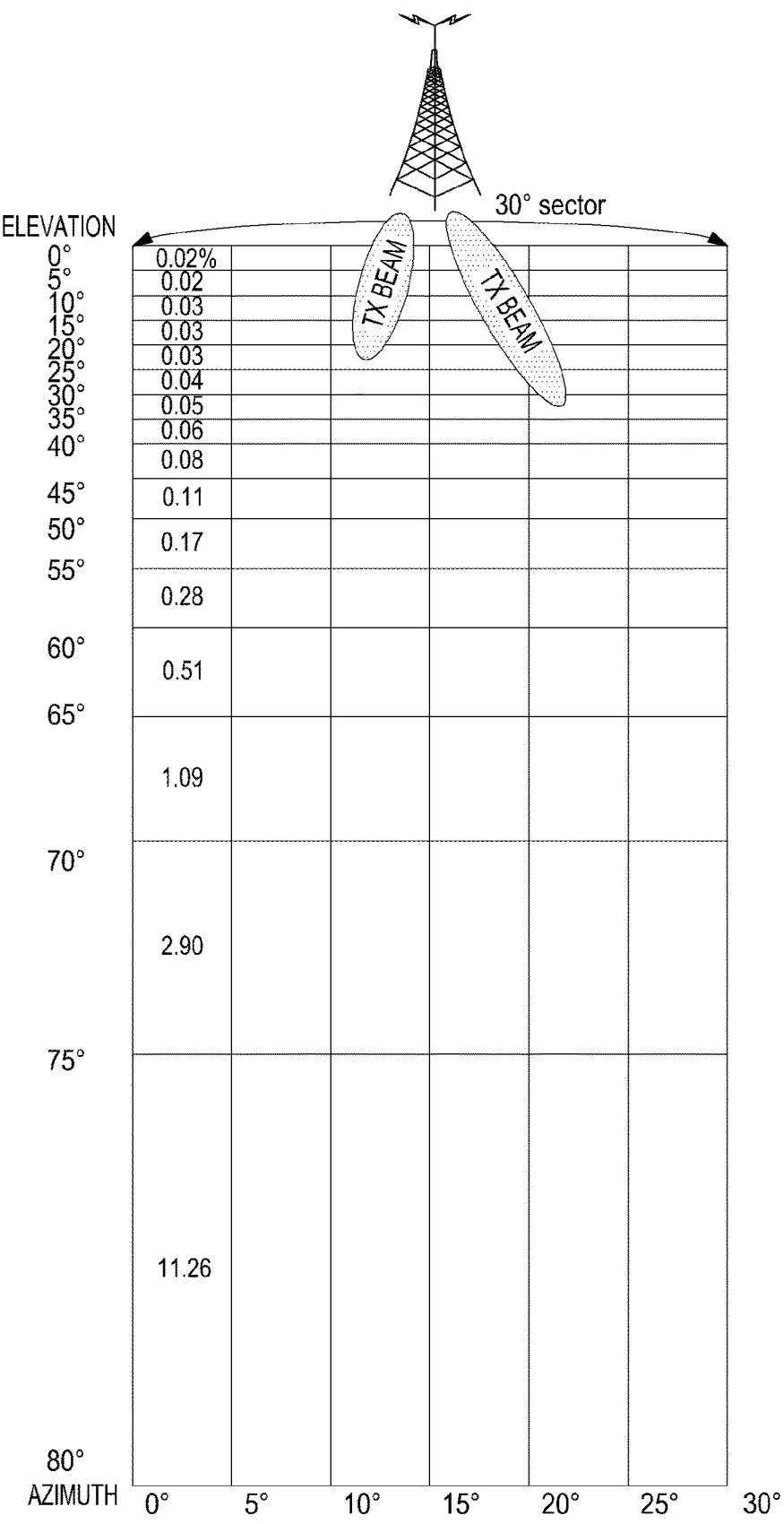
FIG. 4 illustrates a number of transmission beams capable of being transmitted from a base station installed in the manner as illustrated in FIG. 2.

FIG. 4 illustrates a number of transmission beams capable of being transmitted by the base station installed in the manner as illustrated in FIG. 2.

As an example, FIG. 4 illustrates the number of transmission beams capable of being transmitted by the base station when the installed height of the base station is 35 m and the base station transmits transmission beams having a beam width of 5° for each of the elevation angle and azimuth in one sector having an angle of 30° and a coverage of 200 m. In the example of FIG. 4, the number of transmission beams capable of being transmitted by the base station is 16 transmission directions on a 5° basis per each transmission direction for the elevation angle and 6 transmission directions on a 5° basis per each transmission direction for the azimuth. Consequently, the product of the numbers of the transmission directions, i.e. 96 transmission directions exist in total.

The transmission beams transmitted by the base station are transmitted while being spread in a fan shape as illustrated in FIG. 3. However, in the example of FIG. 4, it is assumed that each of the transmission beams arrives at the ground in a rectangular shape for the convenience of description in which each rectangle in FIG. 4 represents one of 96 regions where the transmission beams each having a specific azimuth and a specific elevation angle arrive. In general, signals of each transmission beam may be received in a region other than a transmission target region at a certain intensity. However, in the example of FIG. 4, the reception in a region other than the transmission target region is not considered. As described in FIG. 3, the 96 transmission beams may be transmitted to a farther area as the elevation angle increases and as the transmission beams transmitted to a farther area may be received in a wider area. The percentage written in certain rectangles in FIG. 4 indicate a ratio of an area occupied by a corresponding region in which a transmission beam transmitted to a predetermined position is received, in the entire 96 regions. As illustrated in FIG. 4, it may be seen that a transmission beam transmitted to a boundary region in the service coverage of the base station may be received in a very wide area as compared to a transmission beam transmitted to a region corresponding to the central portion of the service coverage of the base station even if the transmission beams have the same elevation angle beam width and the same azimuth beam width. For example, in the example of FIG. 4 in which it is assumed that the height of the base station is 35 m and the coverage is 200 m, a difference up to 480 times or more occurs in area between reception regions.

Meanwhile, when transmission beams having a narrow elevation angle beam width and a narrow azimuth beam width are used as illustrated in FIG. 4, a number of transmission beams and reception regions exist within the coverage of the base station. When the base station 110 of the example of FIG. 4 transmits SCHs and BCHs in the beam sweeping method in every possible direction for transmitting over the entire service coverage of the base station, repeated transmission of at least 96 times is required. That is, the number of transmission times required for transmitting SCHs and BCHs in the beam sweeping method is proportional to the number of transmission beams existing within the service coverage of the base station 110. Thus, the simplest method for reducing the transmission overhead of DL SCHs and BCHs is to support the entire coverage region of the base station 110 using a smaller number of transmission beams. For this purpose, the beam width of each transmission beam should be relatively wide.

Figure 5:
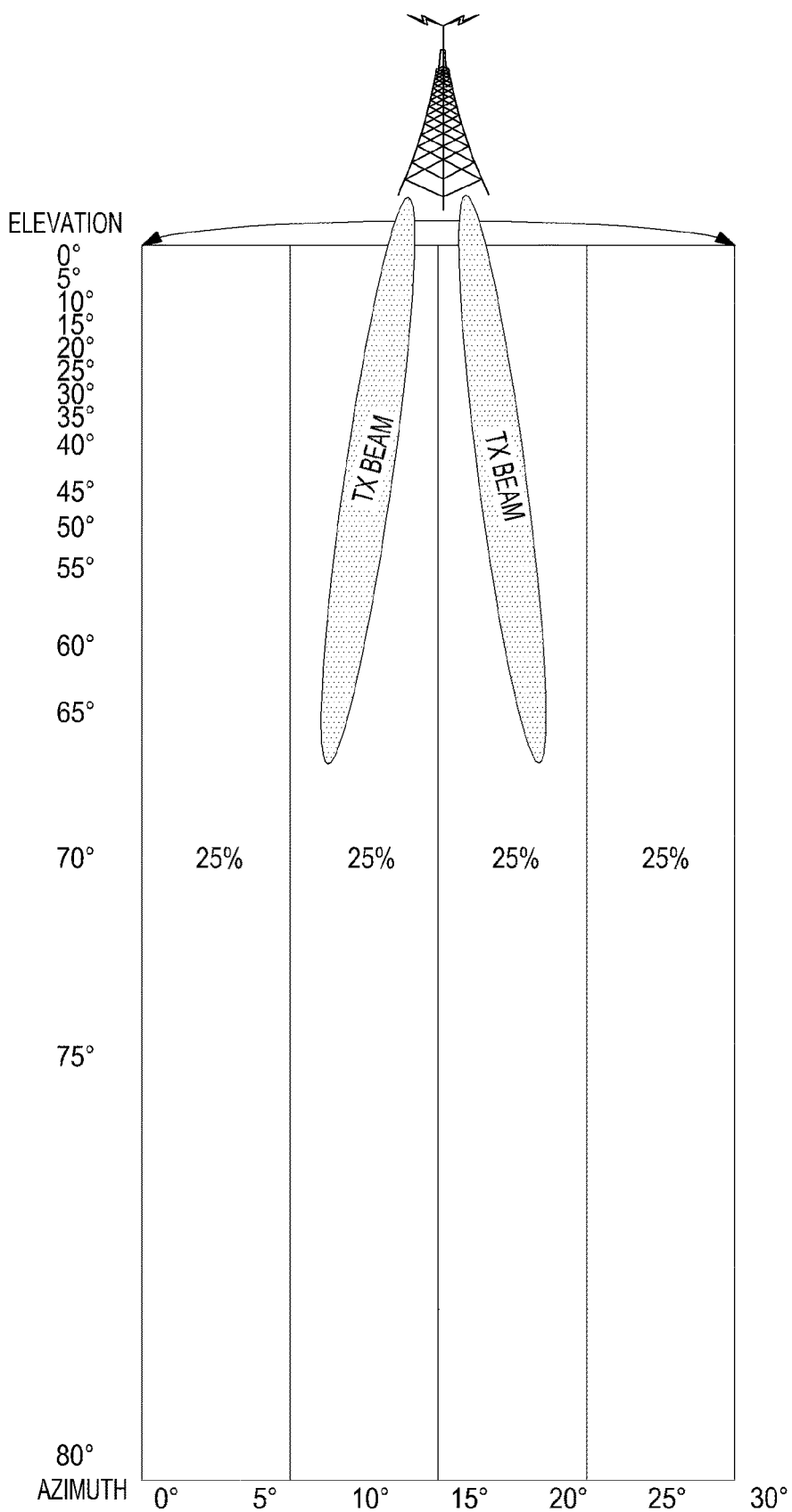
FIG. 5 illustrates transmitting SCHs and BCHs from the base station installed in the manner as illustrated in FIG. 2.

FIG. 5 illustrates transmitting DL SCHs and DS BCHs from the base station 110 installed in the manner as illustrated in FIG. 2.

Here, as an example, it is assumed that a base station transmits DL SCHs and DL BCHs within one sector having a 30° angle and a 200 m coverage using transmission beams having a 80° beam width in elevation angle and a 7.5° beam width in azimuth.

Referring to FIG. 5, DL SCHs and DL BCHs may be transmitted over the entire region of one sector using only four transmission beams which are considerably less than those in the example of FIG. 4. However, as the beam width increases, the beam forming effect decreases in reverse proportion thereto. In addition, as the beam width decreases, the beam forming effect increases. Thus, when the beam width is reduced in order to increase the beam forming effect, the number of the transmission beams required for supporting one base station region increases and thus, the overhead required for transmitting DL SCHs and DL BCHs is increased. As described above, the beam forming effect and the transmission overhead have a trade-off relation with each other.

Figure 6:
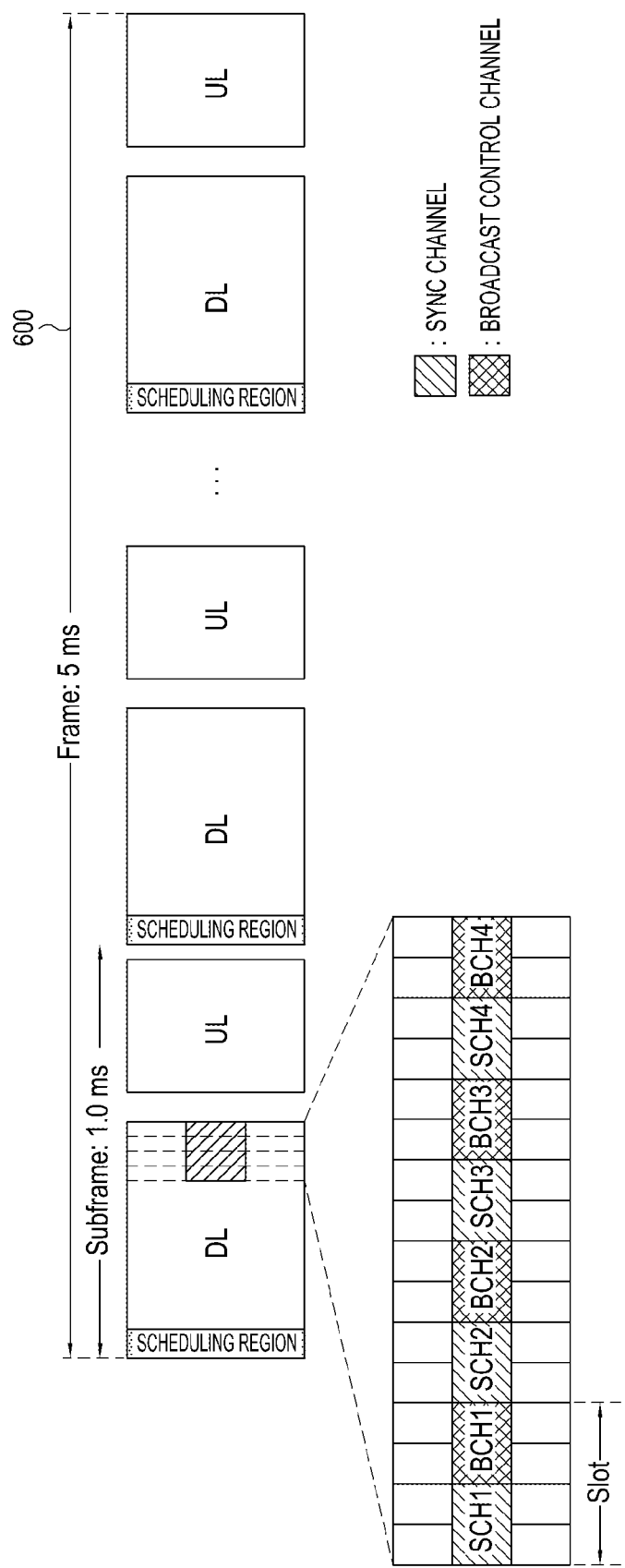
FIG. 6 illustrates a frame structure for transmitting/receiving a signal in a communication system using the beam forming technique according to embodiments of the present disclosure.

FIG. 6 illustrates a frame structure for transmitting/receiving a signal in a communication system using the beam forming technique according to embodiments of the present disclosure.

Referring to FIG. 6, one frame 600 has a length of 5 ms and is configured by five sub-frames. Each of the sub-frames is divided into a DL section in which data is transmitted from a base station to a terminal and a UL section in which data is transmitted from the terminal to the base station.

A part of the DL section is used for transmitting/receiving SCHs and BCHs for transferring information for commonly controlling terminals to the terminal. In the example of FIG. 6, the base station using the beam forming technique repeatedly transmits SCHs including a predetermined first reference signal using transmission beams having a wide beam width in elevation angle in for transmission directions SCH0, SCH1, SCH2, and SCH3 as in the method of FIG. 5. Also, the base station repeatedly transmits BCHs, including control information to be transmitted to the entire area of its service coverage, using transmission beams which are the same with those used for transmitting SCHs in the four transmission BCH1, BCH2, BCH3, and BCH4.

As described above, when DL SCHs and DL BCHs are transmitted using transmission beams having a wide beam width which are the same with those as illustrated in FIGS. 5 and 6, there is a problem in that the beam forming effect is considerably restricted. Whereas, when DL SCHs and DL BCHs are transmitted using narrow transmission beams which are the same with those illustrated in FIG. 4, there is a problem in that the transmission overhead increases greatly.

Thus, the base station dynamically adjusts the beam width of a DL transmission beam according to the transmission target region of the transmission beam, thereby reducing the transmission overhead of DL SCHs and DL BCHs. Specifically, as the distance between the position of the transmission target region where a transmission beam for transmitting DL SCH and DL BCH and the base station transmitter is increased, the beam width of the transmission beam for transmitting the DL SCH and DL BCH is narrowed. The distance between the position of the transmission target region to which a transmission beam is transmitted and the base station transmitter may be defined as a distance between the position of the base station transmitter and the position where the transmission beam arrives at the ground. At this time, the position of the base station transmitter may be determined considering a specific height 201 as illustrated in FIG. 2 or determined only based on the position on the ground.

In addition, in certain embodiments of the present disclosure, the service coverage of the base station: is classified into a central region and a boundary region based on a predetermined reference; determines whether the position of the target region to which a DL transmission beam of the station is transmitted is in the central region side or in the boundary region side as classified above; and dynamically adjusts the beam width for transmitting DL SCH and DL BCH according to the determined position. Specifically, when the position of the target region to which the DL transmission beam is in the boundary region of the service coverage of the base station, DL SCH and DL BCH are transmitted using a transmission beam having a narrow beam width as compared to a transmission beam transmitted to the central region of the service coverage of the base station. In addition, when the position of the target region to which the DL transmission beam is in the central region of the service coverage of the base station, DL SCHs and DL BCHs are transmitted using a transmission beam having a relatively wider beam width than the transmission beam transmitted to the boundary region of the service coverage of the base station.

The method of dynamically adjusting the beam width of the DL transmission beam according to the position of the target region to which the DL transmission beam according to certain embodiments of the present disclosure will be described in detail using a transmission procedure of DL SCHs and DL BCHs.

Figure 7:
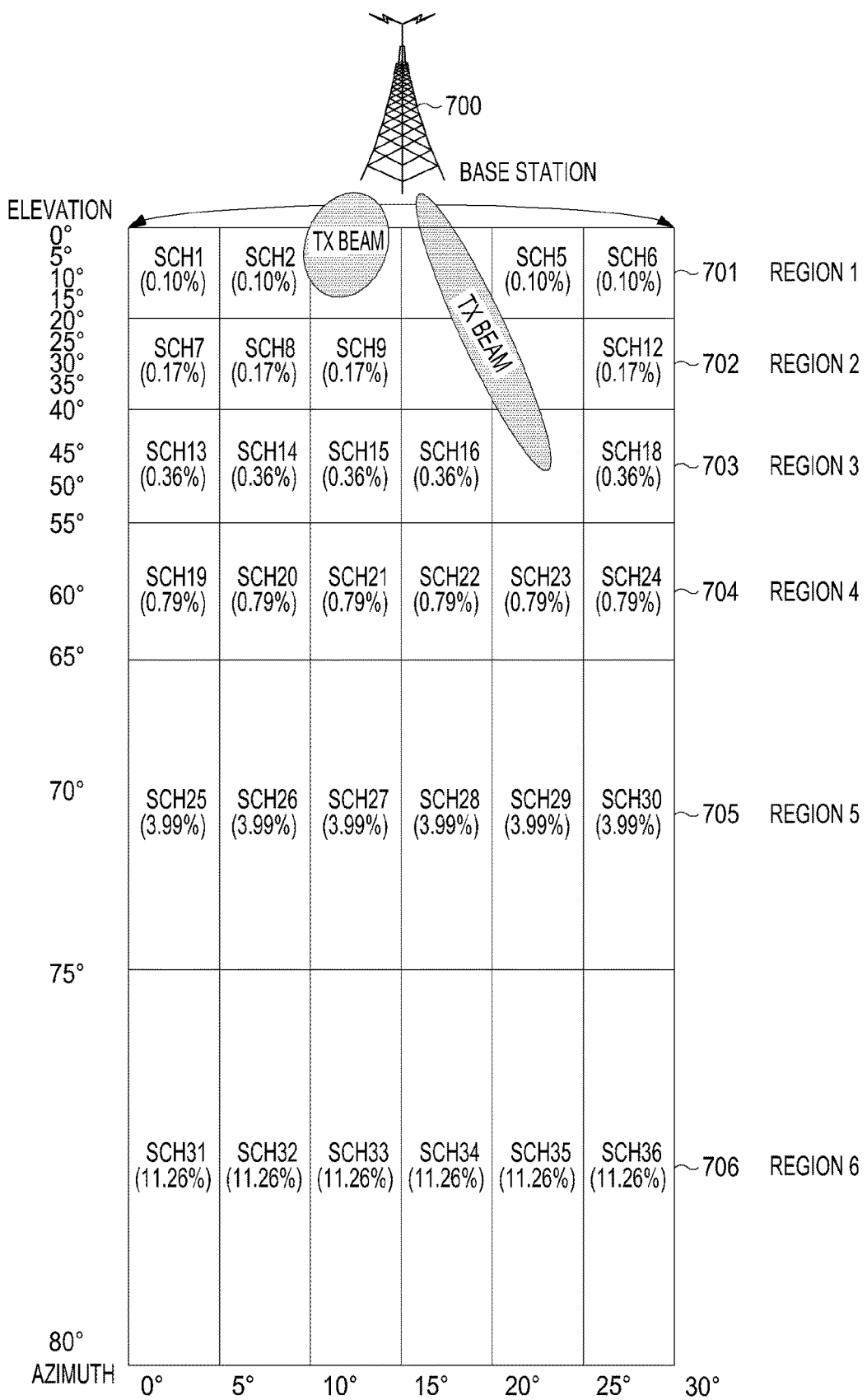
FIG. 7 illustrates configuring transmission beams for transmitting DL SCHs and DL BCHs using various beam widths according to embodiments of the present disclosure.

FIG. 7 illustrates configuring transmission beams for transmitting DL SCHs and DL BCHs using various beam widths according to embodiments of the present disclosure. For the convenience, descriptions will be made on the position of the target position to which the DL SCHs and DL BCHs are transmitted separately for the central region and the boundary region of the service coverage of the base station based on a predetermined reference. As the separating reference, for example, a distance from the base station transmitter may be used. However, it shall be noted that various factors such as the arrangement of base stations and a topographic character of a place where the base stations are positioned may be considered. In addition, the beam widths which are determined depending on whether the position of the target region to which DL SCHs and DL BCHs are transmitted is the central region or the boundary region are set, for example, in a unit of 5 degrees.

Referring to FIG. 7, all the transmission beams transmitted from the base station 700 to transmit DL SCHs and DL BCHs equally have a 5 degree beam width in azimuth but have different beam widths in elevation angle. In addition, in FIG. 7, when the position of the target region to which the DL SCHs and DL BCHs are transmitted is in the boundary region, the base station 700 transmits the DL SCHs and DL BCHs using a relatively narrow beam width as compared to the beam width used when the position of the target region is in the central region. Similarly, when the position of the target region to which the DL SCHs and DL BCHs are transmitted is in the central region side, the base station 700 transmits the DL SCHs and DL BCHs using a relatively broad beam width as compared to the beam width used when the position of the target region is in the boundary region side.

Specifically, in the example of FIG. 7, it is assumed that the position of the target region to which the DL SCHs and DL BCHs are transmitted from the base station 700 is in Region 1 701 and Region 2 702 which belongs to the central region of the service coverage of the base station 700. At this time, the base station 700 uses a 20 degree elevation angle beam width when transmitting DL SCHs and DL BCHs to Region 1 701 and Region 2 702. In addition, the base station 700 uses a 15 degree elevation angle beam width when transmitting DL SCHs and DL BCHs to Region 3 703 which is close to the boundary region of the service coverage of the base station as compared to Region 1 701 and Region 2 702. Further, the base station uses a 10 degree elevation angle beam width when transmitting DL SCHs and DL BCHs to Region 4 704 and Region 5 705 and uses a 5 degree elevation angle beam width when transmitting DL SCHs and DL BCHs to Region 6 706. Among the regions in which the positions of the target regions to which DL SCHs and DL BCHs are transmitted belong to the boundary region of the service coverage of the base station 700, for example, Region 3 703, Region 4 704, Region 5 705 and Region 6 706, the base station 700 transmits DL SCHs and DL BCHs using a relatively narrower elevation angle beam width for the regions in which the positions of the target regions are closer to the boundary of the service coverage of the base station.

When the transmission beams are configured as in FIG. 7 according to the method provided in certain embodiments of the present disclosure, it is possible to transmit SCHs and BCHs to the entire region of one sector having a 30 degree angle and a 200 m coverage using 35 transmission beams in total. Upon comparing the case in which the transmission beams are configured as in FIG. 7 with the method of FIG. 4, it may be seen that the number of required transmission beams are considerably reduced from 96 to 36 and thus, the transmission overhead may be greatly reduced. However, for the boundary regions of the service coverage of the base station where a high beam forming effect is required, the base station may provide a high beam forming effect by using transmission beams having the same narrow beam width.

Figure 8:
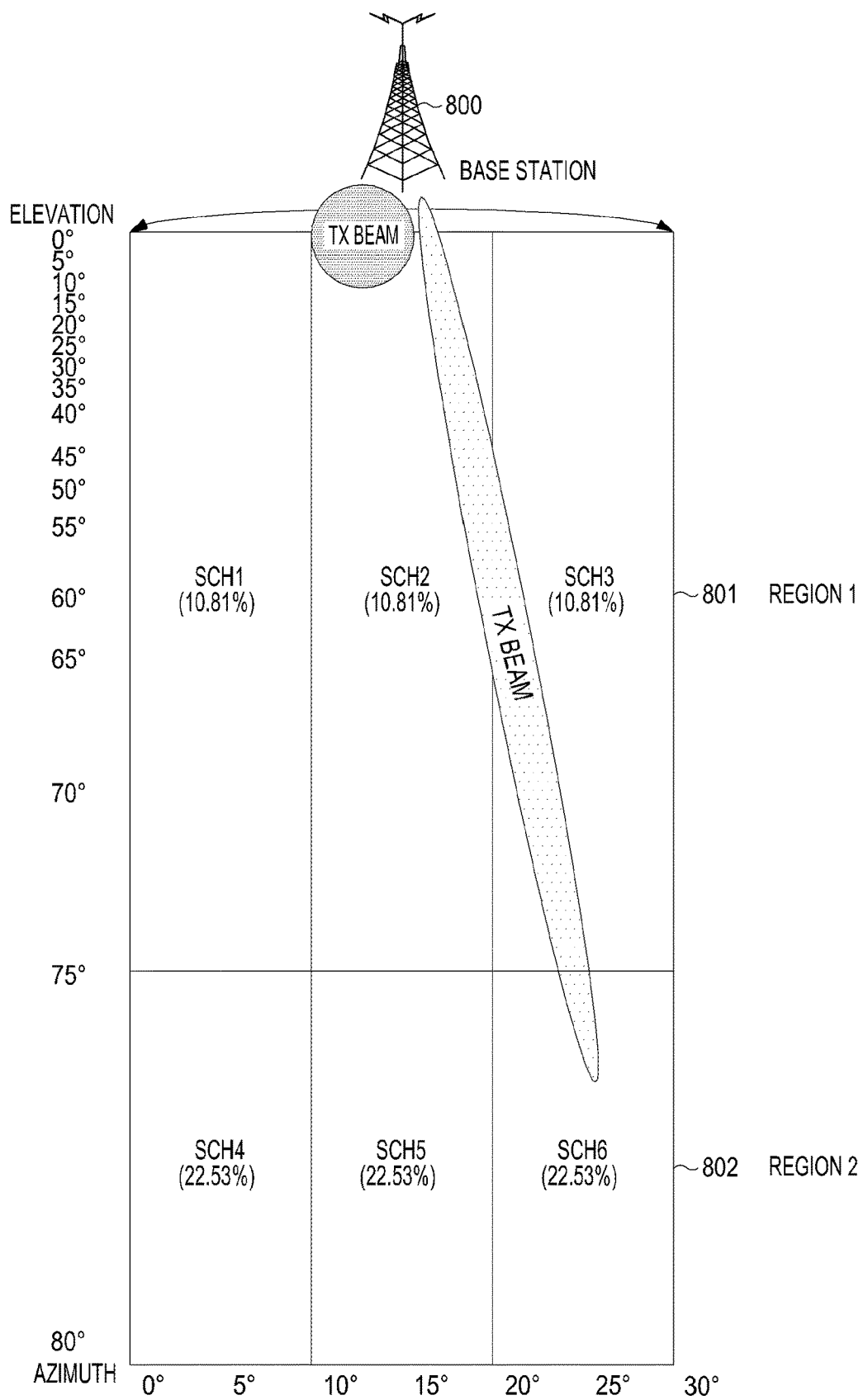
FIG. 8 illustrates configuring transmission beams for transmitting DL SCHs and DL BCHs using various beam widths according embodiments of the present disclosure.

FIG. 8 illustrates configuring transmission beams for transmitting DL SCHs and DL BCHs using various beam widths according to embodiments of the present disclosure. For convenience, descriptions will be made on the position of the target position to which the DL SCHs and DL BCHs are transmitted separately for an internal position positioned inside the service coverage of the base station 800 and an external region positioned outside the service coverage of the base station 800. As the separating reference, for example, a distance from the base station transmitter may be used. However, it shall be noted that various factors such as the arrangement of base stations and a topographic character of a place where the base stations are positioned may be considered. In addition, the beam widths which are determined depending on whether the position of the target region to which DL SCHs and DL BCHs are transmitted is the internal region or the external region are set, for example, in a unit of 5 degrees. Here, it is assumed that Region 1 801 and Region 2 802 correspond to the internal region and the external region, respectively. Referring to FIG. 8, all the transmission beams transmitted from the base station 800 to transmit DL SCHs and DL BCHs equally have a 10 degree beam width in azimuth. In addition, when the position of the target position to which DL SCHs and DL BCHs are transmitted is in Region 1 801, the base station 800 transmits the DL SCHs and DL BCHs using a 75 degree elevation angle beam width. Further, when the position of the target region to which the SCHs and BCHs are transmitted is in Region 2 802 which corresponds to a region overlapping with a region of an adjacent base station, the base station 800 may transmit the DL SCHs and DL BCHs using a 5 degree elevation angle beam width.

Figure 9:
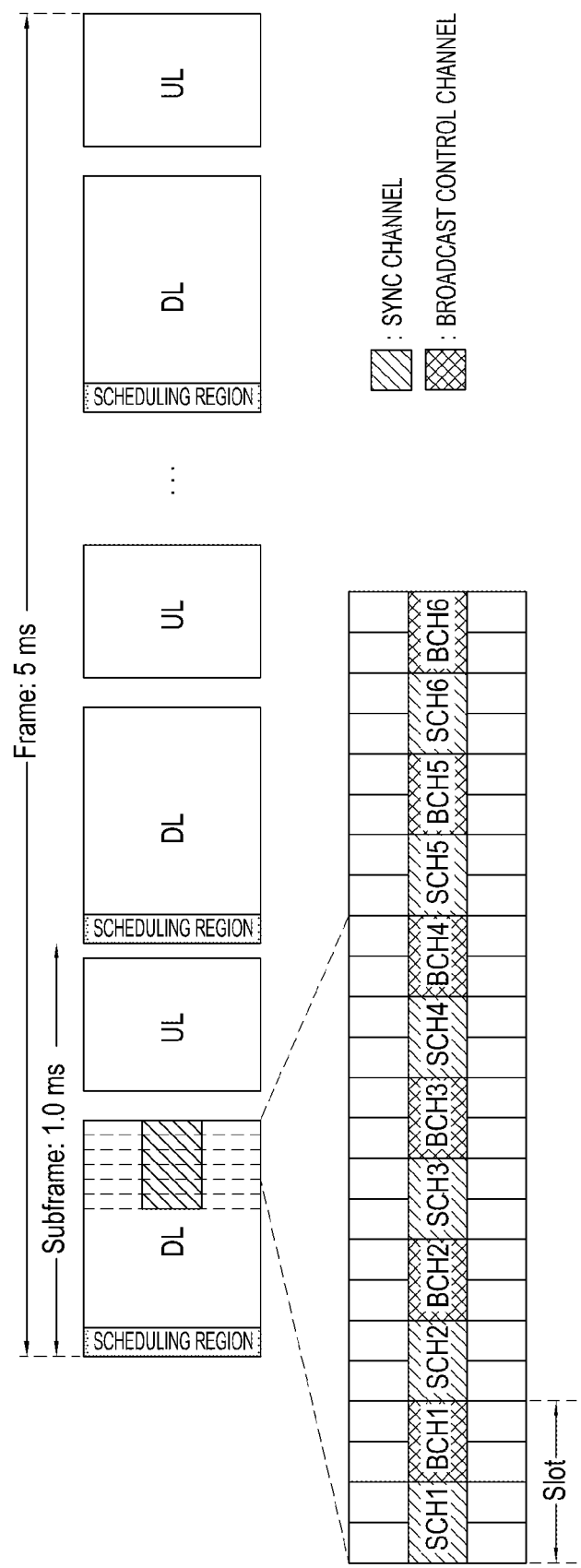
FIG. 9 illustrates times when the base station transmits DL SCHs and DL BCHs using transmission beams of various beam widths according to the method proposed in the example of FIG. 8 and frequency resources on the frame structure of FIG. 6.

FIG. 9 illustrates times when the base station transmits DL SCHs and DL BCHs using transmission beams of various beam widths according to the method of FIG. 8 and frequency resources on the frame structure of FIG. 6.

Referring to FIG. 9, the base station 800 of FIG. 8 transmits the DL SCHs and DL BCHs sequentially to the regions corresponding to SCH1 to SCH 6 which are six regions of the service coverage of the base station using transmission beams having different bean widths at times and frequency regions predetermined for the transmission of SCHs and BCHs.

First, when transmitting SCH1 to SCH3 to the central region, i.e., Region 1 801, the base station 800 uses transmission beams having a relatively broader beam width than the beam width used when transmitting SCH4 to SCH6 to Region 2 802. In addition, when transmitting SCH4 to SCH6 to a boundary region, i.e., Region 2 802, the base station 800 uses transmission beams having a relatively narrower beam width used when transmitting SCH1 to SCH3 to the Region 1 801. Further, the transmission beams have the same transmission period of 5 ms.

Certain embodiments of the present disclosure propose a method of reducing transmission overhead of DL SCHs and DL BCHs by dynamically adjusting, by the base station, the beam width of a DL transmission beam depending on a size or area of a transmission target region of the transmission beam. Specifically, as a size or area of a transmission target region to which a transmission beam for transmitting the DL SCHs and DL BCHs is transmitted is increased, beam width of the transmission beam for transmitting the DL SCHs and DL BCHs is narrowed.

For example, the base station 700 of FIG. 7 uses a 20 degree elevation angle beam width when transmitting DL SCHs and DL BCHs to Region 1 701 and Region 2 702 of which the size or area of the target regions to which the DL SCHs and DL BCHs is smallest. In addition, when transmitting the DL SCHs and DL BCHs to Region 3 703 of which the size or area of the target region is larger than those of Region 1 701 and Region 2 702, the base station 700 uses a 15 degree elevation angle beam width. Furthermore, when transmitting the SCHs and BCHs to Region 4 704 and Region 5 705, the base station 700 uses a 10 degree elevation angle beam width and, when transmitting the SCHs and BCHs to Region 6 706, the base station 700 uses a 5 degree elevation angle beam width. That is, for a target region of which the size or area is larger, the base station 700 transmits DL SCHs and DL BCHs using a relatively narrower elevation angle beam width.

In certain embodiments of the present disclosure, a transmission period of a transmission beam is increased in proportion to a distance from the base station to the position of the target region which is spaced away from the base station and to which the transmission beam or SCHs and BCHs are transmitted within the service coverage of the base station. For example, when the position of the target region to which the transmission beam or the SCHs and BCHs are transmitted is in a boundary region of the service coverage of the base station, the base station transmits the SCHs and BCHs using a relatively longer transmission period than the transmission period for a central region of the service coverage of the base station. In addition, when the position of the target region to which the transmission beam or the SCHs and BCHs are transmitted is in a central region of the service coverage of the base station, the base station transmits the SCHs and BCHs using a relatively shorter transmission period than the transmission period for a boundary region of the service coverage of the base station.

For example, when transmitting SCH4 to SCH6 to Region 2 802 of FIG. 8, the base station 800 uses a transmission period of 15 ms which is relatively long as compared to the transmission period used when transmitting SCH1 to SCH3 to Region 1 801 (e.g., in the example of FIG. 9, 5 ms). As the method of transmitting the transmission beam to the regions of SCH4 to SCH6 in the period of 15 ms, a method of successively transmitting DL SCHs and DL BCHs for SCH4 to SCH6 every 15 ms and a method of sequentially transmitting DL SCHs and DL BCHs for one of SCH4 to SCH6 every 5 ms may be used.

In certain embodiments of the present disclosure, a transmission period of a transmission beam is increased in reverse proportion to a size or area of a target region to which a transmission beam or SCHs and BCHs are transmitted within the service coverage of the base station. For example, when a size or area of a target region to which the transmission beam or the SCHs and BCHs are transmitted is larger, the base station transmits the SCHs and BCHs using a relatively shorter transmission period. In addition, when a size or area of a target region to which the transmission beam or the SCHs and BCHs are transmitted is smaller, the base station transmits the SCHs and BCHs using a relatively longer transmission period.

Meanwhile, the terminal in certain embodiments of the present disclosure receives DL SCHs and DL BCHs transmitted through transmission beams of different beam widths depending on the position of the transmission target region or a size or area of a transmission target region determined within the service coverage of the base station. Accordingly, depending on the position of the terminal, the antenna gain by beam forming becomes varied. Due to this, it is difficult for the terminal to estimate the boundary of the service coverage of the base station based on the reception performance of DL SCHs.

Thus, certain embodiments include a method of making the reception performance of the DL SCHs be successively varied depending on the position of the terminal regardless of a transmission beam width through a process of determining a difference in antenna gain for each transmission beam for DL using the DL SCHs and DL BCHs received by the terminal, and adding the difference to or subtracting the difference from the received signal intensity of the received DL SCHs or the received signal intensity. For this purpose, information for a beam width used for transmitting DL SCHs and DL BCHs and an antenna gain for each beam width is determined in advance considering, for example, a distance and a size or area of a corresponding region. In addition, it is proposed to allow the base station and the terminal to share the information for the beam width and the antenna gain for each beam width which is determined in advance or to deliver the information to terminals by including the information in the BCHs. At this time, the information for the beam width and the antenna gain for each beam width may be indicated, for example, in the form of an offset which enables the beam with of a corresponding transmission beam or the antenna gain for each beam width to be calculated from a reference value which is stored in advance.

First, it is assumed that information for the beam width of each of the DL transmission beams and the antenna gain corresponding to the beam width is shared by the base station and the terminal in advance. In such a case, the terminal acquires a transmission beam identifier using the information of SCHs and BCHs received from the base station. In addition, the terminal acquires a transmission beam width corresponding to the transmission beam identifier and an antenna gain corresponding thereto from the information the terminal shares with the base station.

Next, it is assumed that the terminal receives BCHs in which information for the beam width of each of DL transmission beams and an antenna gain corresponding to the beam width is included from the base station. In such a case, after receiving DL SCHs and DL BCHs, the terminal may acquire a transmission beam identifier included in the received BCHs, and the beam width and the antenna gain corresponding to the transmission beam identifier.

A terminal according to certain embodiments of the present disclosure can remove an influence of a beam width on the SCH reception performance by acquiring beam widths and antenna gains of transmission beams received from the base station, through the above described method, and then adding/subtracting the antenna gains of the received transmission beams or a difference value of the antenna gains to/from the signal intensity of received DL SCHs.

Figure 10:
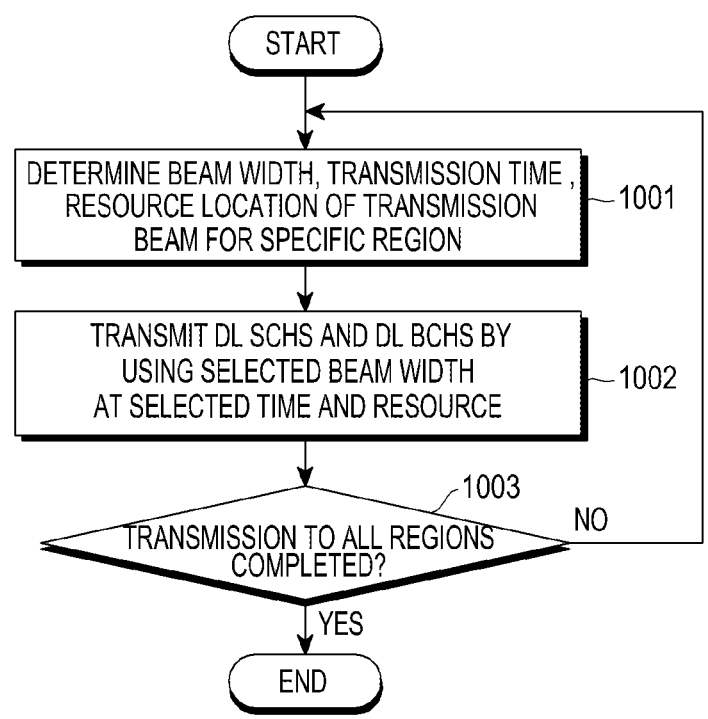
FIG. 10 is a flowchart illustrating the operation of a base station that transmits SCHs and BCHs according to embodiments of the present disclosure.

FIG. 10 is a flowchart illustrating the operation of a base station that transmits SCHs and BCHs according to embodiments of the present disclosure. For convenience, it is assumed that the central region and the boundary region of the service coverage of the base station are determined in advance based on a predetermined reference. As the reference, for example, a distance from the base station may be used. However, it shall be noted that as the reference, various factors, for example, an arrangement of base stations and a topographic character for a place where the base stations are positioned may be considered.

Referring to FIG. 10, in step 1001, the base station determines a beam width and an antenna gain of a transmission beam, a transmission time of the transmission beam and a frequency resource based on a position of a target region to which DL SCHs and DL BCHs are transmitted or a size or area of a target region as described above with reference to FIG. 7 to 9. Specifically, it is determined that when the position of the target region to which the DL SCHs and DL BCHs are transmitted is in the central region side, it is determined that relatively broad transmission beams as compared to the transmission beams transmitted to the boundary region side are used. Also, it is determined that when the position of the target region to which the DL SCHs and DL BCHs are transmitted is in the boundary region side, it is determined that relatively narrow transmission beams as compared to the transmission beams transmitted to the central region side are used. In addition, it is determined that when a size or area of a target region to which the DL SCHs and DL BCHs are transmitted is larger, a narrower transmission beam is used. Also, it is determined that when a size or area of a target region to which the DL SCHs and DL BCHs are transmitted is larger, a broader transmission beam is used. In addition, when the position of the target region to which the DL SCHs and DL BCHs are transmitted is in the central region side, a relatively short transmission period is set as compared to the transmission period of the transmission beams transmitted to the boundary region side. In addition, when the position of the target region to which the DL SCHs and DL BCHs are transmitted is in the boundary region side, a relatively long transmission period is set as compared to the transmission period of the transmission beams transmitted to the boundary region side. In addition, when a size or area of a target region to which the DL SCHs and BCHs are transmitted is larger, a shorter transmission period is set. Also, when a size or area of a target region to which the DL SCHs and BCHs are transmitted is smaller, a longer transmission period is set. At this time, when information for the beam width and an antenna gain of a transmission beam of each position determined by the base station and the transmission time-frequency resource of the transmission beam may be entirely or partly determined in advance and shared by the base station and the terminal or the base station may include the information in the BCHs to be transmitted when the BCHs are transmitted.

In step 1002, the base station transmits the DL SCHs and DL BCHs to a specific region at the time-frequency resource determined as described above using the beam width of the transmission beam determined as described above.

In step 1003, the base station repeats steps 1001 and 1002 until it transmits the SCHs and BCHs to all the regions included in its service coverage. In step 1003, upon completing the transmission of the DL SCHs and DL BCHs for all the regions, the base station ends the transmission of the DL SCHs and DL BCHs.

Figure 11:
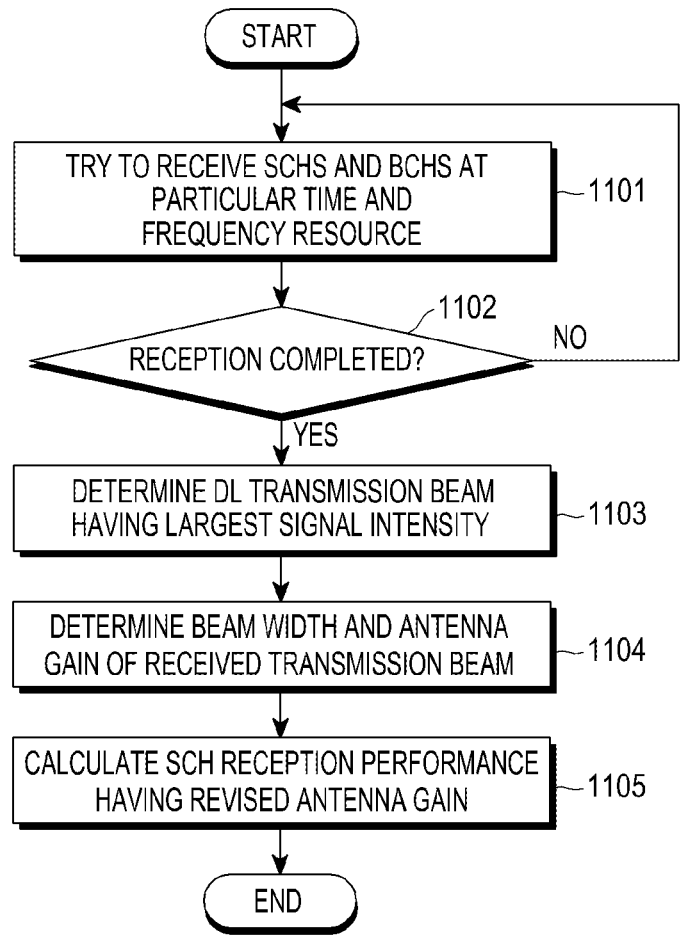
FIG. 11 is a flowchart of the operation of a terminal that receives SCHs and BCHs from a base station according to embodiments of the present disclosure.

FIG. 11 is a flowchart of the operation of a terminal that receives SCHs and BCHs from a base station according to embodiments of the present disclosure.

Referring to FIG. 11, in step 1101, the terminal tries to receive transmission beams which are transmitted by the base station to a plurality of sub-regions within the service coverage of the base station at a time-frequency resource defined as a transmission/reception region of DL SCHs and DL BCHs between the terminal and the base station. Here, a time when the base station transmits the DL SCHs and DL BCHs and the frequency resource may be predetermined between the base station and the terminal or dynamically changed every transmission time so that when transmitting the DL BCHs, the base station may transmit the time-frequency resource information by including the time-frequency resource information in the scheduling information.

In step 1102, the terminal confirms whether or not all the DL SCHs and DL BCHs transmitted by the base station to the plurality of sub-regions included in the service coverage of the base station have been completely received. If it is confirmed that the DL SCHs and DL BCHs have not been completely received, the terminal repeats steps 1101 and 1102 until it receives the DL SCHs and DL BCHs for all the sub-regions.

If it is confirmed that the DL SCH and DL BCH transmitted to all the plurality of sub-regions have been completely received, in step 1103, the terminal determines the transmission beam having the maximum reception intensity among the plurality of transmission beams for transmitting DL SCHs as the transmission beam transmitted to the position of the terminal. In addition, in step 1104, the terminal determines an identifier of the determined transmission beam or information of the region where the terminal is positioned, on the basis of the information of the received SCHs and BCHs. Also, the terminal acquires the beam width and antenna gain of the determined beam, by using a transmission beam identifier, which is shared in advance by the terminal and the base station or received through the BCHs, and a beam width and antenna gain information corresponding thereto.

Then, in step 1105, the terminal may obtain a reception performance in which an influence of beam width is removed from the received signal intensity of the received SCHs through a step of adding or subtracting the acquired antenna gain of transmission beam or a difference value of antenna gain values to or from the signal intensity of the received DL SCHs.

Of course, the method of transmitting data using transmission beams in which various beam widths and transmission periods are dynamically adjusted depending on a position or size or area of a transmission target region within the service coverage of the base station as proposed in the above-described embodiments of the present disclosure may be not only applicable to DL SCHs, DL BCHs or both the channels but also universally applicable when transmitting a general user data using beam forming techniques.

Certain embodiments of the present disclosure include a configuration of primary SCHs and BCHs of which the transmission target region is positioned in the central region within the service coverage of the base station and secondary SCH and BCHs which are additionally and repeatedly transmitted to transmit a signal to a region located far from the base station in addition to the primary SCHs and BCHs. At this time, the secondary SCHs and BCHs may be transmitted in the same direction with the primary SCHs and BCHs using the same transmission beam width. In addition, since the same information is additionally and repeatedly transmitted in addition to the primary SCHs and BCHs, the secondary SCHs and BCHs may be transferred to a farther location. However, in order to suppress the transmission overhead, the secondary SCHs and BCHs may use a transmission period shorter than that of the primary SCHs and BCHs.

Figure 12:
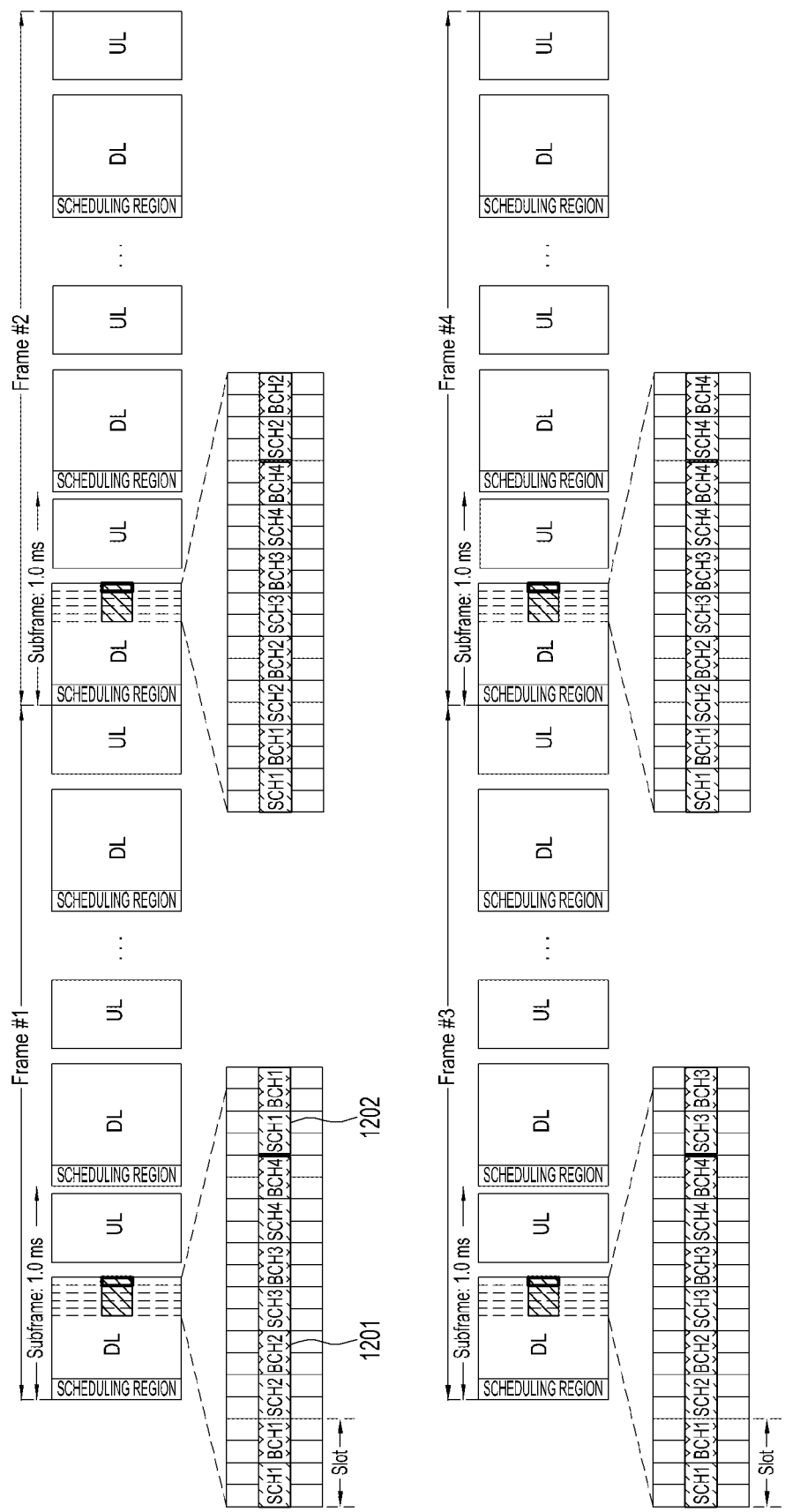
FIG. 12 illustrates a configuration of primary SCHs and BCHs and secondary SCHs and BCHs according to embodiments of the present disclosure.

FIG. 12 illustrates a configuration of primary SCHs BCHs and secondary SCHs and BCHs according to embodiments of the present disclosure.

Referring to FIG. 12, reference numeral 1201 illustrates a configuration of primary SCHs and BCHs of which the transmission target region within the service coverage of the base station is positioned in the central region. The primary SCHs and BCHs 1201 are configured in a repeated transmission structure similar to that illustrated in FIG. 6. Since the primary SCHs and BCHs 1201 are transmitted to the central region of the service coverage of the base station, they may be transmitted using a broad beam width in general.

Reference numeral 1202 illustrates secondary SCHs and BCHs additionally transmitted in addition to the first SCHs and BCHs. The secondary SCHs and BCHs 1202 are additionally transmitted through a time-frequency region determined in advance for transmitting a signal to the boundary region of the service coverage of the base station in addition to the primary SCHs and BCHs 1201. The secondary SCHs and BCHs 1202 may be transmitted in the same transmission direction with the primary SCHs and BCHs using the same beam width to send the same information. However, in order to suppress the transmission overhead, the secondary SCHs and BCHs 1202 are transmitted using a transmission period set to be different from the primary SCHs and BCHs 1201. In the example of FIG. 12, the secondary SCHs and BCHs 1202 have the same beam width with the primary SCHs and BCHs 1201. However, the secondary SCHs and BCHs have a transmission period of 20 ms which is four times of 5 ms which is the transmission period of the primary SCHs and BCHs 1201. Since the secondary SCHs and BCHs 1202 are channels to be transmitted so as to transmit a signal to the boundary region of the base station, the secondary SCHs and BCHs may be occasionally transmitted using a relatively narrower beam width than the beam width of the primary SCHs and BCHs 1201.

Figure 13:
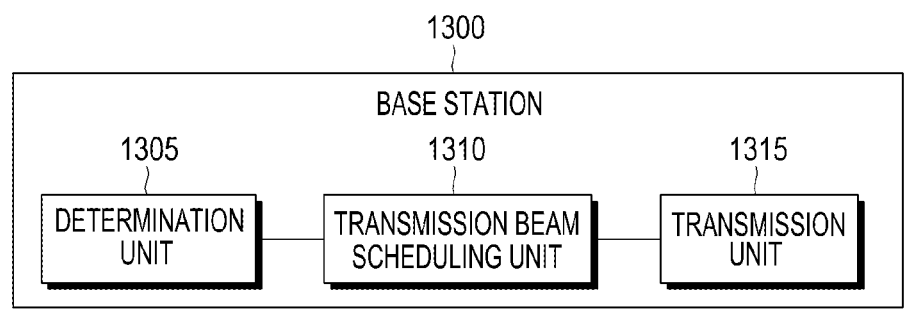
FIG. 13 illustrates a base station according to embodiments of the present disclosure.

FIG. 13 illustrates a base station according embodiments of the present disclosure. For convenience, a position of a target region to which DL SCHs and DL BCHs are transmitted will be separately described for the central region and the boundary region of the service coverage of the base station service on the basis of a predetermined reference. As the reference, for example, a distance where the SCHs and BCHs are received from the base station may be used. However, it shall be noted that in the reference, various factors such as an arrangement of base stations and a topographic characteristic of a place where base stations are positioned may be considered.

Referring to FIG. 13, the base station 1300 includes a determination unit 1305, a transmission beam scheduling unit 1310 and a transmission unit 1315.

The determination unit 1305 determines whether a position of a target region to which the SCHs and BCHs are transmitted within the service coverage thereof corresponds to the central region or the boundary region. In addition, the determination unit 1305 determines a target region to which SCHs and BCHs are transmitted within the service coverage thereof or a size or area of the target region.

The transmission beam scheduling unit 1310 determines the beam width and antenna gain of a transmission beam to be used when transmitting DL SCHs and DL BCHs to a corresponding position, and the transmission time and frequency resource of the transmission beam as described with reference to FIGS. 7 to 9 according to the positional information of the transmission target region or information for a size or area of a transmission region acquired from the determination unit 1305. In addition, the transmission unit 1315 transmits the DL SCHs and DL BCHs to a specific region at the determined time-frequency using the beam width of the transmission beam determined from the transmission beam scheduling unit 1310.

When the transmission of the DL SCHs and BCHs for all the regions is completed, the base station 1300 ends the transmission of the DL SCHs and DL BCHs.

Figure 14:
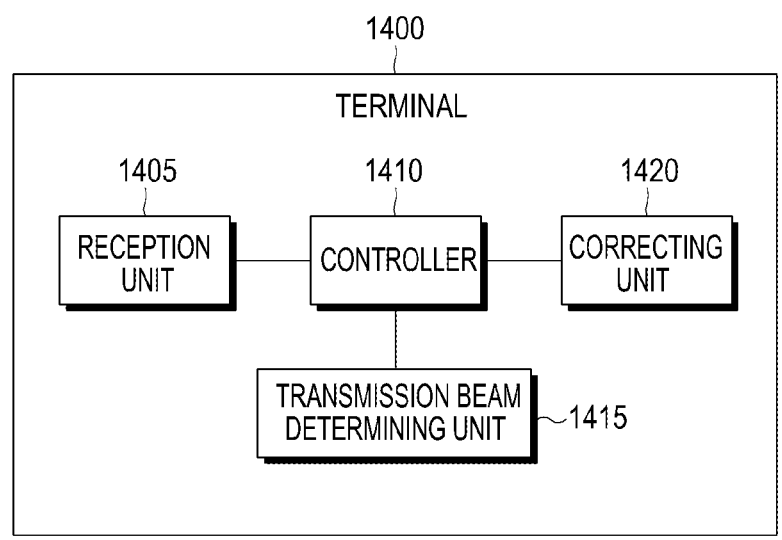
FIG. 14 illustrates a terminal according to embodiments of the present disclosure.

FIG. 14 illustrates a terminal according to embodiments of the present disclosure.

Referring to FIG. 14, the terminal 1400 includes a reception unit 1405, a controller 1410, a transmission beam determining unit 1415, and a correcting unit 1420.

The reception unit 1405 tries to receive transmission beams transmitted by the base station to a plurality of regions within the service coverage of the base station at a time-frequency resource defined as the transmission/reception region of DL SCHs and DL BCHs between the terminal 1400 and the base station. Here, the time and frequency resource for transmitting SCHs and BCHs by the base station may be determined in advance between the base station and the terminal or dynamically changed at every transmission time and may be received together with BCHs when receiving the BCHs from the base station.

The controller 1410 confirms whether or not the reception unit 1405 has completed the reception of DL SCHs and DL BCHs transmitted to the plurality of sub-regions within the service coverage from the base station. When it is confirmed that the reception has not been completed, the controller repeats the operation of receiving the SCHs and BCHs until also the DL SCHs and DL BCHs transmitted to the plurality of sub-regions are received.

When it is confirmed that the reception of SCHs and BCHs has been completed for all the plurality of sub-regions, the controller 1410 determines the transmission having the maximum reception intensity among the plurality of transmission beams for transmitting DL SCHs as the transmission beam transmitted to the position of the terminal. In addition, the controller 1410 acquires an identifier of the determined transmission beam or information for the region where the terminal is positioned on the basis of the information of the SCHs and BCHs and transfers the identifier or the information to the correcting unit 1420. Further, the controller 1410 acquires the beam width and antenna gain of the determined transmission beam using a transmission beam identifier shared in advance with the base station or received through the BCHs and a beam width and an antenna gain corresponding thereto and transfers the beam width and antenna gain of the determined transmission beam to the correcting unit 1420.

Then, the correcting unit 1420 may acquire the reception function of DL SCHs and DL BCHs in which the influence of beam width is removed through a step of adding or subtracting the acquired antenna gain of the transmission beam or a difference value of antenna gain values to or from the signal intensity of the DL SCHs.

Although the present disclosure has been described with certain embodiments, various changes and modifications may be suggested to one skilled in the art. It is intended that the present disclosure encompass such changes and modifications as fall within the scope of the appended claims.

What is claimed is:

1. A method for transmitting a signal by a transmitting apparatus in a beam forming-based communication system, the method comprising
    transmitting a first reference signal using a first transmission beam based on a first transmission period and a second reference signal using a second transmission beam based on a second transmission period,
    wherein a first beam width of the first transmission beam is broader than a second beam width of the second transmission beam if a first target region of the first transmission beam is closer to the transmitting apparatus than a second target region of the second transmission beam,
    wherein the first beam width of the first transmission beam is narrower than the second beam width of the second transmission beam if a size of the first target region of the first transmission beam is larger than a size of the second target region of the second transmission beam,
    wherein the size of the first target region is determined based on a first elevation angle and a first azimuth of the transmitting apparatus for the first transmission beam, wherein the size of the second target region is determined based on a second elevation angle and a second azimuth of the transmitting apparatus for the second transmission beam, and wherein the first transmission period is shorter than the second transmission period if the first beam width of the first transmission beam is broader than the second beam width of the second transmission beam.

2. The method of claim 1, wherein a first frequency resource of the first transmission beam differs from a second frequency resource of the second transmission beam.

3. A method for receiving a signal by a receiving apparatus in a beam forming-based communication system, the method comprising receiving a first reference signal using a first transmission beam based on a first transmission period and a second reference signal using a second transmission beam based on a second transmission period, wherein a first beam width of the first transmission beam is broader than a second beam width of the second transmission beam if a first target region of the first transmission beam is closer to a transmitting apparatus than a second target region of the second transmission beam, wherein the first beam width of the first transmission beam is narrower than the second beam width of the second transmission beam if a size of the first target region of the first transmission beam is larger than a size of the second target region of the second transmission beam, wherein the size of the first target region is determined based on a first elevation angle and a first azimuth of the transmitting apparatus for the first transmission beam, wherein the size of the second target region is determined based on a second elevation angle and a second azimuth of the transmitting apparatus for the second transmission beam, and wherein the first transmission period is shorter than the second transmission period if the first beam width of the first transmission beam is broader than the second beam width of the second transmission beam.

4. The method of claim 3, wherein a first frequency resource of the first transmission beam differs from a second frequency resource of the second transmission beam.

5. A transmitting apparatus for transmitting a signal in a beam forming-based communication system, the transmitting apparatus comprising:

a transceiver; and a processor operably connected to the transceiver, the processor configured to transmit a first reference signal using a first transmission beam based on a first transmission period and a second reference signal using a second transmission beam based on a second transmission period, wherein a first beam width of the first transmission beam is broader than a second beam width of the second transmission beam if a first target region of the first transmission beam is closer to the transmitting apparatus than a second target region of the second transmission beam, wherein the first beam width of the first transmission beam is narrower than the second beam width of the second transmission beam if a size of the first target region of the first transmission beam is larger than a size of the second target region of the second transmission beam, wherein the size of the first target region is determined based on a first elevation angle and a first azimuth of the transmitting apparatus for the first transmission beam, wherein the size of the second target region is determined based on a second elevation angle and a second azimuth of the transmitting apparatus for the second transmission beam, and wherein the first transmission period is shorter than the second transmission period if the first beam width of the first transmission beam is broader than the second beam width of the second transmission beam.

6. The transmitting apparatus of claim 5, wherein a first frequency resource of the first transmission beam differs from a second frequency resource of the second transmission beam.

7. A receiving apparatus for receiving a signal in a beam forming-based communication system, the receiving apparatus comprising:

a transceiver; and a processor operably connected to the transceiver, the processor configured to receive a first reference signal using a first transmission beam based on a first transmission period and a second reference signal using a second transmission beam based on a second transmission period, wherein a first beam width of the first transmission beam is broader than a second beam width of the second transmission beam if a first target region of the first transmission beam is closer to a transmitting apparatus than a second target region of the second transmission beam, wherein the first beam width of the first transmission beam is narrower than the second beam width of the second transmission beam if a size of the first target region of the first transmission beam is larger than a size of the second target region of the second transmission beam, wherein the size of the first target region is determined based on a first elevation angle and a first azimuth of the transmitting apparatus for the first transmission beam, wherein the size of the second target region is determined based on a second elevation angle and a second azimuth of the transmitting apparatus for the second transmission beam, and wherein the first transmission period is shorter than the second transmission period if the first beam width of the first transmission beam is broader than the second beam width of the second transmission beam.

8. The receiving apparatus of claim 7, wherein a first frequency resource of the first transmission beam differs from a second frequency resource of the second transmission beam.

* * * * *